United States Patent
Symons

(10) Patent No.: US 6,248,812 B1
(45) Date of Patent: Jun. 19, 2001

(54) METHOD OF TREATING LIGNOCELLULOSIC MATERIAL OR AN EXPANDED MINERAL TO FORM A FINISHED PRODUCT

(75) Inventor: Michael Windsor Symons, Pretoria (ZA)

(73) Assignee: Windsor Technologies Limited, Nassau (BS)

( * ) Notice: Subject to any disclaimer, the term of this patent is extended or adjusted under 35 U.S.C. 154(b) by 0 days.

(21) Appl. No.: 09/367,566

(22) PCT Filed: Feb. 18, 1998

(86) PCT No.: PCT/GB98/00517

§ 371 Date: Aug. 17, 1999

§ 102(e) Date: Aug. 17, 1999

(87) PCT Pub. No.: WO98/37032

PCT Pub. Date: Aug. 27, 1998

(30) Foreign Application Priority Data

Feb. 18, 1997 (ZA) .................................................... 97/1359
Jun. 3, 1997 (ZA) .................................................... 97/4873

(51) Int. Cl.[7] .................................................... C08K 3/00
(52) U.S. Cl. .................................................... 524/2
(58) Field of Search .................................................... 524/2

(56) References Cited

U.S. PATENT DOCUMENTS

| | | |
|---|---|---|
| 3,800,016 | 3/1974 | Roberts .................... 264/45 |
| 3,974,024 | 8/1976 | Yano et al. .................... 162/101 |
| 4,026,980 | 5/1977 | Hubbard .................... 264/50 |
| 4,086,098 * | 4/1978 | Ruyet .................... 106/97 |
| 4,100,115 | 7/1978 | Baer . | 
| 4,122,203 | 10/1978 | Stahl .................... 428/300 |
| 4,127,628 | 11/1978 | Uchida et al. .................... 264/42 |
| 4,172,056 | 10/1979 | Marra .................... 260/17.2 |
| 4,190,547 | 2/1980 | Mahnke et al. . |
| 4,229,223 | 10/1980 | Flake . |
| 4,306,395 | 12/1981 | Carpenter .................... 52/223 R |
| 4,630,419 | 12/1986 | Pilgrim . |
| 4,722,866 | 2/1988 | Wilson .................... 428/411.1 |
| 4,748,771 * | 6/1988 | Lehnert .................... 49/399 |
| 4,810,569 | 3/1989 | Lehnert et al. .................... 428/285 |
| 5,395,571 * | 3/1995 | Symons .................... 264/42 |
| 5,601,919 * | 2/1997 | Symons .................... 428/375 |

FOREIGN PATENT DOCUMENTS

| | | |
|---|---|---|
| 3414299 A1 | 10/1984 | (DE) . |
| 531 050 | 3/1993 | (EP) . |
| 1183955 | 3/1970 | (GB) . |
| 1 576 537 | 10/1980 | (GB) . |
| WO 91/04291 | 4/1991 | (WO) . |

OTHER PUBLICATIONS

Patent Abstract of Japan vol. 017, No. 700 (C–1145), Dec. 21, 1993 & JP 05 237470 A (Sangyo Gijutsu Kenkyusho:KK), Sep. 17, 1993.

* cited by examiner

*Primary Examiner*—Paul R. Michl
(74) *Attorney, Agent, or Firm*—Pillsbury Winthrop LLP

(57) ABSTRACT

A method of preparing a starting material for the subsequent manufacture of a finished product such as a board, from a feedstock selected from the group consisting of a lignocellulosic material, exfoliated vermiculite, expanded perlite or a mixture of two or three thereof, includes the steps of providing the feedstock in the form of substantially dry finely divided lignocellulosic fibres or substantially dry finely divided exfoliated vermiculite or expanded perlite particles or a mixture thereof; mixing the feedstock with a suitable amount of a thermosetting resin in finely divided dry powder form and a suitable amount of the hydraulic binder in finely divided dry powder form; and optionally subjecting this starting material to suitable conditions of temperature and pressure to cause the thermosetting resin to set to form a cohesive product thereafter, there may be provided to the cohesive product, water in an amount sufficient for the hydration of the hydraulic binder so that the hydraulic binder sets to form the finished product.

12 Claims, No Drawings

METHOD OF TREATING LIGNOCELLULOSIC MATERIAL OR AN EXPANDED MINERAL TO FORM A FINISHED PRODUCT

BACKGROUND OF THE INVENTION

This invention relates to a method of preparing a starting material for the subsequent manufacture of a finished product, from a feedstock comprising substantially dry finely divided lignocellulosic fibres, or exfoliated vermiculite particles, or expanded perlite particles, and to a process of preparing a finished product therefrom.

Lignocellulosic composite board products, either in flat or shaped form, manufactured from chips, particles, fibres, veneers, flakes or strands of natural fibrous plant materials such as agri fibres or wood, are well known and are currently made by a number of different methods. Such products are commonly bound by formaldehyde condensation resins such as the ureas, melamines and phenolics, or the polyureas or isocyanates. Despite the success of such lignocellulosic composite board products, there is always a need for new types of products, and in particular for products made from new types of feed material.

The material rejected in the mechanical cleaning of recovered paper is probably in the region of ten million tons globally based on 1995 figures and a 91% yield. The recycling of paper waste is rapidly falling behind demand for waste disposal. There is clearly a need for the utilisation of these materials but process difficulties have arisen. One is the presence of minerals in these materials, accounting for as high a proportion as 50% of the sludges and another is the difficulty in processing to make good quality products.

The present invention seeks to utilise the sludges, as well as other feedstocks such as medium density fibre, for the production of useful products.

SUMMARY OF THE INVENTION

According to a first aspect of the invention there is provided a method of preparing a starting material for the subsequent manufacture of a finished product, from a feedstock selected from the group consisting of a lignocellulosic material, exfoliated vermiculite, or expanded perlite, or a mixture of two or three thereof, which method includes the steps of:
(1) providing the feedstock in the form of substantially dry finely divided lignocellulosic fibres or substantially dry finely divided exfoliated vermiculite particles or substantially dry finely divided expanded perlite particles, or a mixture of two or three thereof; and
(2) mixing the feedstock with:
(a) a suitable amount of a thermosetting resin in finely divided dry powder form, and
(b) a suitable amount of a hydraulic binder in finely divided dry powder form;
to give the starting material.
The method preferably includes the step of:
(3) subjecting the starting material of step (2) to suitable conditions of temperature and pressure to cause the thermosetting resin to set to form a cohesive product.
According to a second aspect of the invention there is provided a process of preparing a finished product from a cohesive product produced by the method described above, which process includes the step of:
(A) providing to the cohesive product, water in an amount sufficient for the hydration of the hydraulic binder so that the hydraulic binder sets to form the finished product.

By "finely divided lignocellulosic fibres" there is meant unifibres or bundles of a small number of unifibres of a lignocellulosic material. In other words, the lignocellulosic material is broken down into single fibres or bundles of a small number of fibres, rather than being in chip or particle form. The fibres have a length of from 0.5 mm to 12 mm inclusive, preferably from 1 mm to 6 mm inclusive.

By "finely divided exfoliated vermiculite particles" there is meant exfoliated vermiculite in micron (0.5 mm and smaller), superfine (1 mm and smaller), fine (2 mm and smaller), medium (4 mm and smaller) and large (8 mm and smaller) particle size.

By "finely divided expanded perlite particles" there is meant expanded perlite or volcanic glass in particle sizes of from 5 microns to 2000 microns diameter inclusive.

The lignocellulosic feedstock may already be in finely divided fibrous form.

However, in step (1) the lignocellulosic feedstock may be prepared from pellets or chips of a suitable material, by milling or abrading or the like. In this case step (1) may precede or follow step (2).

The thermosetting resin is preferably a novolac phenol formaldehyde resin with a suitable catalyst.

The thermosetting resin is preferably used in an amount of 2% to 20% inclusive of the thermosetting resin by mass of the hydraulic binder, i.e the mass ratio of the thermosetting resin to the hydraulic binder is from 2:100 to 20:100.

The hydraulic binder is a substance which hydrates and sets in combination with water. The hydraulic binder is preferably selected from the group consisting of Portland Cement, high alumina cement, gypsum cement, calcium sulphate hemihydrate in either the alpha or beta form, magnesium oxychloride, magnesium oxysulphate, a calcium sulphoaluminate cement, an alkali silicate, and ground granulated blast furnace slag, and a mixture of any two or more of these binders.

The hydraulic binder is preferably used in an amount of 50% to 2000% inclusive of the hydraulic binder by mass of the feedstock, i.e the mass ratio of the hydraulic binder to the feedstock is from 1:2 to 20:1, preferably in a mass ratio of 10:1 to 5:1 for finished products with high densities, and preferably in a mass ratio of 5:1 to 1:1 for finished products with low densities.

In addition to components (a) and (b), the feedstock may be mixed with:
(c) a suitable amount of a thermoplastic resin in finely divided particulate or fibrous form.
Further, in addition to components (a), (b) and optionally (c), the feedstock may be mixed with:
(d) a suitable amount of a filler material selected from inorganic or mineral fibres, inorganic particles, synthetic fibres, and mixtures of two or more thereof.
In step (A) of the process, the water required for hydration of the hydraulic binder may be introduced into the cohesive product from an external source, for example as steam, or may be provided by one or more of the components of the cohesive product, from which water is released, for example on heating.

DESCRIPTION OF EMBODIMENTS

The crux of the invention is that a feedstock, being substantially dry finely divided lignocellulosic fibres, or substantially dry finely divided exfoliated vermiculite or expanded perlite particles, or a mixture of two or three thereof, is mixed with a thermosetting resin in finely divided dry powder form and with a hydraulic binder in finely divided dry powder form to give a starting material. Thereafter this starting material is subjected to suitable conditions of temperature and pressure to cause the thermosetting resin to set to form a cohesive product.

The provision of the feedstock in a finely divided fibrous or particulate form is important to prevent particle separation in the formation of the starting material and subsequently the cohesive product. A key feature of the cohesive product is that it may be formed from dry components that do not separate from one another during formation of the cohesive product.

The feedstock may be lignocellulosic fibres.

A preferred lignocellulosic fibrous material is paper mill sludge, waste paper or medium density fibre.

Paper mill sludge is a dewatered effluent of paper manufacture or recycling.

A typical makeup of a paper mill sludge is a pH of 8.13, and a fibre percentage of 14.4. An analysis of the sludge, utilising qualitative X-ray emission scans, reveals a composition as follows: Ca 18%; K 0.23%; Cl 0.2%; P 0.15%; S 0.12%; Si 4.4%; Al 3%; Mg 0.8%; Na 0.17%; C 68% and Fe 1.7%.

The hydrocarbon content as determined by the burn off method of the sludge is as follows:

| INORGANIC ANALYSIS | | |
| --- | --- | --- |
| % LOI at 600° C. (indicative of total organics) | | 79,10 |
| % Ash at 900° C. | | 20,74 |

LOI = loss on ignition

| | % Ash (m/m) | % Sample (m/m) |
| --- | --- | --- |
| Calcium as CaO | 8,28 | 1,72 |
| Aluminium as $Al_2O_3$ | 13,57 | 2,81 |
| Magnesium as MgO | 0,41 | 0,09 |
| Iron as $Fe_2O_3$ | 0,43 | 0,09 |
| Phosphates as $PO_4^{3-}$ | NDetected | ND (zero) |
| Sulphates as $SO_4^{2-}$ | 24,00 | 4,98 |
| Acid insolubles | 52,02 | 10,65 |

| ORGANIC ANALYSIS | | |
| --- | --- | --- |
| % Extractable Organic Matter | | 1,53 |
| 3000–2800 | $cm^{-1}$ - C—H | (aliphatic hydrocarbon) |
| 1780–1650 | $cm^{-1}$ - C—O | (acid/ester absorption) |
| 1610 | $cm^{-1}$ - C—H | (aromatic group absorption) |
| 1460 | $cm^{-1}$ - $CH_2$ | (hydrocarbon) |
| 1380 | $cm^{-1}$ - $CH_3$ | (hydrocarbon) |
| 1250 | $cm^{-1}$ - C—O | (acid/ester absorption) |
| 1020, 750, 710 | $cm^{-1}$ - C—H | (aromatic group absorption) |

The percentage consistency of such a sample is about 24.3% and the loss on ignition of such a sample is about 27.9%.

The paper mill sludge, or waste paper which has been slushed to give a 2% to 30% suspension in water, is cleaned, for example by centrifuging, to remove high and low density plastics, stone, sand and metal and other such impurities. The material is then passed to a clarifier from which it emerges as a sludge or a 2% solids in water suspension. This sludge is passed through a roller press to give approximately 20% solids in water sludge, which is then typically fed through a screw press and a pelletising screen to produce sludge pellets having a 30% to 60% solids percentage. These pellets are then dried, typically in a rotary drier, to a moisture percentage from 0% to 15%, preferably in the range of from 0% to 3%.

There pellets are then ready to use to form the feedstock for the method of the invention.

The pelletising of the sludge is very important. It is essential to allow practicable drying, handling and mixing of the material with the thermosetting resin and the hydraulic binder.

In order to form the feedstock for the method of the invention, the pellets the paper mill sludge or waste paper must be milled. The milling may be carried out prior to or after combination of the pellets with the thermosetting resin and the hydraulic binder.

The milling may be carried out in an attritor mill or a plate mill or a stone mill, whereby two plates in close proximity to each other, either horizontally or vertically, are moved at different speeds to each other, typically with one plate being stationary, although both plates may move. The pellets are fed through the centre of the plates and are spun outwardly by the centrifugal force. This causes the fibres in the pellets to separate without being reduced in length. All solid agglomerates are broken down into finely divided fibrous form.

The milling action also has the effect of introducing an electrostatic charge into the lignocellulosic fibres which assists in adhering the thermosetting resin and the hydraulic binder thereto.

Electrostatic induction is an option during milling or blending to prevent sifting or powder separation. Electrostatic induction may be induced by friction on the finely divided dry powder binder particles both organic and inorganic, before they are applied to the fibre in the blender or the fibres themselves may be electrostatically charged by passing them through an electro magnetic field.

Another material for use as the feedstock of the invention is medium density fibres (MDF). MDF is produced from soft woods or hard woods. Slab wood or round wood is converted into chips with a typical dimension of about 20 mm in a chipping machine. The chips are then screened to remove undersized materials such as those below 5 mm, and oversized materials such as those over 40 mm. The sized chips are then treated to remove adhering dirt or grit and are steamed for several minutes under pressure at a temperature of about 160° C. Thereafter the steamed chips are forced into the narrow gap between the rotating discs of a refiner. An example of such a refiner is a Sund Defibrator. Individual fibres or fibre bundles are mechanically abraded from the surfaces of the steam softened chips. These then pass from the refiner to a dryer. For example, in a dryer the wet fibres, including some residual steam, are combined with hot flue gases from a gas burner and the mixture then passed at high velocity along a flash drying tube. At the end of the tube the dried fibres are separated from the steam and the hot gases in a cyclone and are stored ready for use.

As stated above, the pellets of paper mill sludge or waste paper, or the feed stock produced by milling of these pellets, or the MDF, is then mixed with a thermosetting resin and with a hydraulic binder.

In the case of pellets of paper mill sludge or waste paper, the pellets may be mixed with the thermosetting resin and with the hydraulic binder prior to milling to assist in mixing of the various components.

Finely divided lignocellulosic fibres may also be derived from cereal straw such as wheat, oats, barley or rice, fibrous material extracted from palm fronds, kapok, sisal, hemp, certain of the grass species, flax, and stalks of the cotton plant, fibres derived from husks from the cereal crops such as rice and wheat, and fibres extracted from ground nut shells and the like.

The feedstock may be exfoliated vermiculite particles.

Vermiculite belongs to the group of hydrated lamina industrial minerals, which are all aluminium-iron magnesium silicates, high in silica, and which propagate bonding in a cement matrix. They resemble a muscavite (mica) in appearance. When subjected to heat, vermiculite exfoliates due to the inter lamina generation of steam. The pH is typically in the region of 9, specific gravity 2.5, melting point 1315° C., sintering temperature 1260° C. and bulk densities are between 50 and 120 g/litre. The product exfoliated vermiculite is non corrosive, non combustible and non abrasive. A typical particle size suitable for this invention is the grade FNX by Micronised Products of South Africa, with a screen analysis −20 to 40% retained on a 2000 micron screen, 90 to 95% retained on a 710 micron screen, or alternatively the grade SFX where 50 to 75% is retained on a 1000 micron screen, 20 to 35% retained on a 710 micron screen and 0 to 10% retained on a 355 micron screen. Because exfoliated vermiculite is compressible, densities of the final product may be reduced downward to as low as 850 kg/m$^3$. Typical applications of this specification would be interior building boards for walls or ceilings, bound either with calcium sulphate hemihydrates or ordinary Portland cement.

Perlite is a natural glass. It is an amorphous mineral consisting of fused sodium potassium aluminium silicate. It occurs naturally as a silicacious volcanic rock. The distinguishing feature that sets perlite apart from other volcanic glasses is that when heated rapidly to above 870° C., it expands to from four to twenty times its original volume as the chemically combined water vaporises. This creates countless tiny bubbles in the heat softened glassy particles. Typical chemical analysis of perlite indicates that silicon oxide percentage exceeds 70%, aluminium oxide exceeds 11% and metallic oxides make up virtually the rest of the composition. Specific gravity is 2.3, softening point 870° C. to 1093° C. and fusion point 1260° C. to 1345° C. The preferred particle size is from 200 to 2000 micron. An example is Genulite Grade M 75 S by Chemserve Perlite (Pty) Ltd of South Africa.

The feedstock may also be a blend, in any proportion, of two or three of the materials described above.

For example, where a material is to be classified as a non-combustible material, the organic percentage of the material should be below 7.5%. In this case, assuming that the thermosetting resin, which is regarded as an organic material, is present in an amount of 5%, then the maximum amount of lignocellulosic fibrous material which can be present is 2.5%. In this case, the remainder of the feedstock is comprised of exfoliated vermiculite particles or expanded perlite particles or a mixture thereof.

The first component which is used with the feedstock is a thermosetting resin in finely divided dry powder form.

The thermosetting resin is preferably a novolac phenol formaldehyde resin, which is used with a suitable catalyst.

A novolac phenol formaldehyde resin is a resin in which the molar ratio of phenol to formaldehyde exceeds parity.

An example of a suitable catalyst for use with such a resin is hexamethylene tetramine. An example of a suitable novolac phenol formaldehyde resin and catalyst combination is a two stage resin with a hexamethylene tetramine content of between 6 and 14%, with a hot plate gel time at 150° C. of between 40 and 120 seconds, with a flow in mm at 125° C. of between 30 and 75 mm, and with a particle size sieve analysis percentage retained on a 200 mesh screen of a maximum of 2%. Examples are the PRP resins of South Africa, code Varcum 7608 which may be used as modifier for a slow curing phenolic system such as Varcum 3337. A more rapid curing system i.e gel in 20–40 S, at 150° C., is preferred i.e PRP Code 7608.

The thermosetting resin is preferably used in an amount of 2% to 20% inclusive of the thermosetting resin by mass of the hydraulic binder, i.e in a mass ratio of the thermosetting resin to the hydraulic binder of from 2:100 to 20:100.

The second component is a hydraulic binder, i.e a substance which hydrates and sets in combination with water.

The hydraulic binder is preferably chosen from the group comprising Portland Cement, high alumina cement, gypsum cement, calcium sulphate hemihydrate either in the alpha or beta form, magnesium oxychloride, magnesium oxysulphate, a calcium sulphoaluminate cement, an alkali silicate, such as sodium silicate, and a ground granulated blast furnace slag or a combination of any two or more thereof.

The hydraulic binder is preferably used in an amount of 50% to 2000% inclusive of the hydraulic binder by mass of the feedstock, i.e a mass ratio of the hydraulic binder to the feedstock of from 1:2 to 7:1, preferably in a mass ratio of 10:1 to 5:1 for finished products with high densities, and preferably in a mass ratio of 5:1 to 1:1 for finished products with low densities.

Other components may also be added into the mixture.

It has also been found that improvements may be achieved by mixing the feedstock not only with a thermosetting resin and a hydraulic binder, but also with a suitable amount of a thermoplastic resin in finely divided particulate or fibrous form.

The thermoplastic resin may be, for example, polypropylene, polyethylene or polyvinyl chloride.

The thermoplastic resin has preferably been modified by irradiation or fluorination.

At temperatures in excess of 150° C., these particles or fibres of a thermoplastic resin melt and flow to reinforce, and bind, and to provide effectively a "platelet" inclusion in the matrix of the cohesive product formed.

Generally, the amount of thermoplastic resin added will be such so as not to interfere with the water wicking propensity of the cohesive product, necessary for subsequent rehydration of the hydraulic binder.

As stated above, the thermoplastic resin added has preferably been modified by irradiation or fluorination in order to propagate cross-linking and adhesion to the feedstock, as well as to the other components of the starting material.

In the case of irradiation, the thickness of the thermoplastic film for fibre production may be between 5 and 3000 microns and the particle size between 50 to 500 microns more preferably below 150 microns. The thermoplastic fibres are made from a film or sheet through conversion of a suitable thermoplastic polymeric starting material, modified by ionising radiation prior to conversion to the film or sheet. In addition, the finely divided dry particles of thermoplastic polymer may be modified with the same ionising radiation, in bags. The ionising radiation employed can be produced either by a suitable radioactive isotope, such as cobalt-60, or a suitable electron beam accelerator which generates energetic electrons with an energy of 50 keV to 10 MeV. The absorbed radiation dose applied to the thermoplastic polymeric starting material may be of the order of 4 to 150 kGy and conventional electron beam accelerators or gamma irradiators can be employed for this purpose.

In the case of fluorination, which is a less preferred method, the particles of thermoplastic resin are fluorinated with fluorine gas, preferably diluted with either oxygen or nitrogen or other gas, up to the level of 99%. Fluorine is a very strong oxidising agent and the process of fluorination induces the bonding of reactive groups to the polymer, which in turn induces adhesion. In this case, much lower pressing temperatures are desirable.

The inclusion of a thermoplastic resin propagates synergistic binding with the novolac resin or other thermosetting resin present. In addition the thermoplastic resin is alkali resistant, contributes to toughness, reinforcement, flexural strength and resistance to impact in the final product.

Another optional additive is a suitable amount of a filler material selected from inorganic or mineral fibres such as rock wool, mineral wool, glass fibres and ceramic fibres; inorganic particles such as silica fume and fly ash; and synthetic fibres such as acrylic fibres, polyester fibres, acrylonitrile fibres, and the like.

These filler materials, when in particulate form, must have a surface area of 100 m$^2$ per kilogram or greater, and when in fibrous form, must be unifibres or bundles of a small number of unifibres.

A preferred filler material is silica fume. Silica fume has the capacity to react with free calcium hydroxide, forming calcium silicate hydrate. It accelerates the setting of the hydraulic binder. As a result of its very small particle size of 20,000 m$^2$/kg, it minimises porosity in the finished product, improves strength, minimises retardation by the soluble substances in the lignocellulosic fibres, contributes to the cohesion of the cohesive product and minimises particle separation as a function of its low bulk density. The silica fume, such as CSF-90 by Anglo Alpha Cement of South Africa, may be added in an amount of up to 15% by mass on the mass of the hydraulic binder.

Another optional additive is a redispersable synthetic powder which is added to modify the inorganic hydraulic binder. When a redispersable synthetic powder is added, on subsequent water wetting of the cohesive product, the powder redisperses and intimately wets the cohesive product, imposing toughness, additional resistance to weathering, the ability to breathe and proofness to water penetration.

Examples of these re-dispersible powders are the Vinnapas re-dispersible powders by Wacker Chemie. They are re-dispersible ethylene-vinyl acetate co polymer powders, examples being RE 526 Z and RE 530 Z or the terpolymer powder R1 538 Z, which has particularly high water repellence. These powder products improve adhesion between organic and inorganic components. Because of the presence of protective colloids they improve water retention during the hydration phase and they minimise evaporation due to film formation at the surface. Flexural strength is improved, as is toughness. Addition levels are between 3 and 10% more typically 5% on the weight of the binder used. Typical resin types are vinyl acetate/ethylene co polymers with polyvinyl alcohol as a protective colloid. The predominant particle sizes are 1 to 5 micron. Example of a homo polymer vinyl acetate dry powder for addition to cements are the Mowilith powders D and DS by Hoechst. A further example is Mowilith powder DM 200 P which is a fine particle size co polymer in finely divided dry powder form based on vinyl acetate and vinyl ester of a long chain branched carboxylic acid. The Mowilith powders are also suitable for the modification of the composite board product properties.

Auxiliary acceleration of binding of the hydraulic binders may be provided by water donors such as the hydrates or hemi hydrates of calcium sulphate, or certain of the aluminium trihydrates or the like, which give off chemically bound water at elevated temperatures during the forming of the product. In addition catalytic or synergistic binder aids may be included such as calcium oxide to speed the set of sodium silicate or sodium silicate cement blends, and fly ash or silica fume acting as a pozzolanic binders, or finely ground limestone, in the latter two cases propagating rapid hydration by crystal "seeding".

There may also be incorporated other additives, such as for example a fire retardant or fire inhibitor, a bactericidal agent, a fungicide, an insecticide, an ultra violet light stabiliser or absorber, an anti oxidant, a scent or a deodoriser.

Lignocellulosic water soluble extractives may inhibit the setting of some hydraulic binders, particularly Portland cement. It is thought that inhibition is a function of the "sheathing" of available calcium ions, retarding the growth of calcium silicate hydrates. It is water soluble sugars, water soluble higher carbohydrates such as hemicellulose, and insoluble carbohydrates that solubilise under the influence of the high alkalinity of Portland cement, that are chiefly responsible. Lignins have no inhibitory effect. Therefore the choice of lignocellulosic fibre can be important. Minimising or eliminating the inhibiting effects of water soluble lignocellulosic extractives may be achieved by the following:

1. The addition of soluble inorganic salts as accelerators, particularly the chlorides of zinc, iron, magnesium, aluminium or calcium, but particularly calcium in the form of calcium chloride. These are added in the proportions of 1% to 7% by mass of the starting material but more preferably in the range of 2% to 5%. Calcium chloride promotes an increased amount of calcium ions in the matrix. The draw back of chlorides being potentially highly corrosive, is not as significant in a composite not containing metal reinforcement.
2. The inclusion of a silica fume as a superpozzalan accelerating the formation of calcium silicate hydrate by reacting with the calcium hydroxide formed during early hydration reactions.
3. Impregnating water into the formed composite while it is still hot from the press, but below 100° C., in order to accelerate the chemical hydration reaction.
4. The inclusion of quick reaction chemicals such as aluminium sulphate to accelerate hydration reactions.

When all the components have been mixed, the starting material may be subjected to suitable conditions of temperature and pressure to cause the thermosetting resin to set to form a cohesive product.

For example, the mixture may be placed in a suitable press or mould and then subjected to suitable conditions of pressure and temperature to allow the resin present to polymerise or set.

More specifically for example, the mixture may be compressed and heated in a suitable press or mould at temperatures from 125° C. to 255° C. inclusive, preferably from 140° C. to 225° C. inclusive, and pressures of from 5 to 70 kg/cm$^2$ (0,49–6,9 MPa) inclusive.

This results in a cohesive product which may then be stored for any length of time before being formed into a finished product.

As an alternative, the mixture from step (2) may be stored for further processing.

The cohesive product so produced as described above may then be utilised in a process for preparing a finished product. According to this process, there is provided to the cohesive product, water in an amount sufficient for the hydration of the hydraulic binder so that the hydraulic binder sets to form the finished product.

For example, in the pressing step, steam may be injected into the cohesive product through apertures in the press plates or in the mould, which steam provides the water for hydration of the hydraulic binder to form the finished product.

Alternatively, after pressing, water may be applied to the cohesive product to allow the penetration of a suitable quantity thereof to provide for complete hydration of the hydraulic binder to form the finished product.

As a further alternative, the cohesive product may be placed in an autoclave and then subjected to a vacuum for typically 15 minutes. Thereafter water is introduced into the autoclave until it is full and then the water is subjected to a pressure of typically 6 bar for 20 minutes. Thereafter the water is expelled by compressed air. This method allows the water uptake of the cohesive product to be controlled within narrow limits, typically in the range of 19 to 28% of the mass of the cohesive product.

As a further alternative, the water necessary for hydration may be provided by a component or components of the cohesive product so that, for example, on heating, this water is released and is utilised by the hydraulic binder to hydrate and set.

Auxiliary binders in liquid form may be blended with the water for hydration chosen from the group comprising of:

(i) a sodium silicate solution (ii) a polymer dispersion such as a polyvinyl acetate or acrylic.

(iii) a polyvinyl alcohol solution, such as the partially hydrolysed low viscosity specifications, i.e a 3% solution of Mowiol 4/88 by Hoechst.

(iv) a magnesium oxide solution (v) a calcium oxide solution

When the hydraulic binder is a magnesium oxide, then the water may include hydrochloric acid so that the magnesium oxide is converted to a magnesium oxychloride binder.

The finished product may be for example a board which may be either flat or corrugated or otherwise shaped or a profile.

The invention therefore provides a means of converting paper mill sludge or mixed common paper waste or MDF or other suitable fibrous or particulate material, into a value added product suitable for use in the furniture or building industry. The hydraulic binders such as Portland cement impose upon the product suitable resistance to water swelling, resistance to weathering and to fire, and make the board suitable as an exterior exposed building product. Where calcium sulphates are used, adequate behaviour in fire, appropriate cohesive strength and excellent finishing properties are imposed, though lower process temperatures are required. Moreover when either Portland cement or calcium sulphate is used the resulting board product is less brittle than the conventional cementitious or gypsum board products, and cuts and works or machines more easily and has excellent finishing properties as a result of the reinforcing element of the finely divided lignocellulosic fibre, the auxiliary binding of the novolac and the inorganic binding contribution of the hydraulic binder. Synergy between the hydraulic binders may be made use of. For example, blending of a calcium sulphate hemihydrate with a Portland cement may rapidly accelerate the setting of the binders and contribute to better properties in the final product.

Additional hydrophobisation of the finished product when bound principally by inorganic binders, particularly Portland cement, is imposed by including in the water for hydration, added after product forming, of silicone micro emulsion concentrate dispersed in water at the level of from 0.2 to 8%, more generally in the range of 1 to 3%, thereby forming silicone mesophases with a particle size in the sub microscopic range of 10 to 80 nm. The silicone micro emulsions or SMCs have great alkali stability and good penetration properties. Examples are Wacker BS1306, Wacker BS1000 and Wacker 1311. Wacker BS 1306 is a solvent free water miscible emulsion of a polysiloxane modified with functional silicone resin. It imposes water resistance, water repellency and water vapour permeability.

It is to be noted that by varying the type and quantity of feedstock used to make the starting material, and then the cohesive product and thus the finished product, the density of the finished product may be varied considerably. For example, by using exfoliated vermiculite as the feedstock, either alone or in part, densities may be reduced 700 kg/m$^3$. At the other end of the scale, a finished product with a density of 2000 kg/m$^3$ may be prepared, which product is suitable as a floor or wall tile or roof tile.

It is also possible to make a finished product consisting of two or more layers or horizons. For example, it is possible to make a finished product where the two outer layers of the product comprise exfoliated vermiculite with hydraulic binder and thermosetting resin, and where the inner layer is formed from a lignocellulosic fibrous material, hydraulic binder and thermosetting resin. This provides a finished product with no lignocellulosic component exposed. Instead, the outer layers contain exfoliated vermiculite which is stable and does not expand or contract on water wetting, and is inert and fireproof.

Other advantages of the method of the invention are that the cohesive product may be cut to size and machined, prior to preparation of the finished product. All waste resulting from the sizing and machining may be returned to the beginning of the method for reuse. This is not possible with products made by the conventional wet methods. In addition, the method of the invention is generally quicker and cheaper than conventional wet methods of manufacture of similar products.

EXAMPLE 1

An example of an exterior building board made by the method of the invention will now be given:

1 100 kg of paper mill sludge is pelletized to pellet sizes of approximately 4mm diameter, and these are dried to 10% water content.

2 The product of step 1 is milled in an attritor stone mill.

3 180 kg of ordinary Portland cement is blended with 35 kg of sodium silicate SP33 by Silicate & Chemical Industries of South Africa with $SiO_2$ to $Na_2O$ weight ratio of 3,3 to 1, and with 7 kg of Novolac Resin Code 3337 by PRP with a hexamethylene tetramine percentage of 6,3 to 6,8%.

4 The product of step (3) is blended with that of step (2)

5 The product of step (4) is laid up on a caulk plate at 13,50 kg/m$^2$.

6 The product of step (5) is pressed to a thickness of 10 mm at a pressure of 37 kg/cm$^2$ (3,63 MPa) and temperature of 180° C. for 5 minutes to form a board.

7 The board is now irrigated with a 1½% solution of Mowiol (by Hoechst) code 4/88 polyvinyl alcohol in water solution at the rate of 1 kg per side, a total of 2 kg/m$^2$, left until full cement cure is achieved. However, immediately on water wetting, the sodium silicate reacts with uncombined calcium present in the cement to form insoluble calcium silicate thus blocking the pores and hardening the surface. This renders the cementitous composite waterproof, reduces dusting, increases abrasion resistance, increases resistance to acid attack, renders the cement board oil proof and propagates the very rapid, almost instantaneous set of hydraulic binders present.

Auxiliary binding is provided by the polyvinyl alcohol but its principal function is to beneficiate the reinforcing and integrity of the lignocellulosic fibres.

EXAMPLE 2

An example of a roof tile manufactured by the method and process of the invention is given below. The following ingredients are mixed as a completely dry feedstock combination and laid up in a uniform mat before entry into the press:

| | |
|---|---|
| 250 kg | Catalysed ground blast furnace slag |
| 250 kg | Rapid hardening Portland cement |
| 75 kg | Un-densified silica fume |
| 50 kg | Specially milled coconut palm tree leaf fibre |
| 200 kg | Micron grade particle size exfoliated vermiculite |
| 50 kg | Mica |
| 70 kg | Novolac dry powder resin containing hexamethylene tetramine catalyst |
| 7 kg | Calcium chloride as accelerator |

This is pressed at 45 bar (4.5 MPa) at 180° C. to form a cohesive product. Roof tiles are produced typically in a carousel configuration. After pressing, they are trimmed, stacked, placed in an autoclave, and optionally subjected to a vacuum (15 KPa) for 15 minutes, after which water may be introduced and subjected to a pressure of 6 bar (0.6 MPa) for 20 minutes. The absorption of water by the pressed roof tiles is an average 23% by mass of the dry roof tile before water impregnation. Cement hydration is allowed to go to completion. The tiles may then be dried, decorated and shipped. The advantage is that they may be half the thickness and half the weight of conventional concrete roof tiles. The final density of the product is of the order of 1900 kg/m$^3$.

EXAMPLE 3

A further example of a light weight non-combustible cementitious board for building applications such as sheathing is made of the following:

| | |
|---|---|
| 60 kg | Milled paper mill sludge |
| 750 kg | Micron grade exfoliated vermiculite |
| 1200 kg | Rapid hardening Portland cement |
| 7 kg | 10 mm Polyethylene fibre |
| 90 kg | Novolac dry powder phenol formaldehyde resin containing hexamethylene tetramine catalyst. |

This composite is mixed, laid up in a mat of uniform bulk density and is pressed at a temperature of 200° C. for 10 seconds per mm thickness at a pressure of 4 MPa to yield a cohesive product. After the impregnation of water by vacuum and pressure in an autoclave and after the cement has been fully hydrated, the product is dried to give a board which has a final dry density of 825 kg/m$^3$. The boards are sanded to a smooth finish for ease of painting.

What is claimed is:

1. A method of preparing a cohesive product containing a hydraulic binder, for the subsequent manufacture of a finished product by hydration of the hydraulic binder in the cohesive product, from a feedstock selected from the group consisting of a lignocellulosic material, exfoliated vermiculite, expanded perlite, and a mixture of two or three thereof, which method includes the steps of:
   (1) providing the feedstock in the form of substantially dry finely divided linocellulosic fibres, or substantially dry finely divided exfoliated vermiculite particles, or substantially dry finely divided expanded perlite particles, or a mixture of two or three thereof;
   (2) mixing the feedstock with:
      a) a suitable amount of a thermosetting resin in finely divided dry powder form, and
      b) a suitable amount of hydraulic binder in finely divided dry powder form; to give a dry starting material; and
   (3) forming the dry starting material of step (2) while subjecting it to suitable conditions of temperature and pressure to cause the thermosetting resin to set to form the cohesive product.

2. A method according to claim 1 wherein the mass ratio of the hydraulic binder to the feedstock is from 1:2 to 20:1.

3. A method according to claim 1 or claim 2 wherein the mass ratio of the thermosetting resin to the hydraulic binder is from 2:100 to 20:100.

4. A method according to claim 1 wherein the thermosetting resin is a novolac phenol formaldehyde resin which is used with a catalyst.

5. A method according to claim 1 wherein the hydraulic binder is selected from the group consisting of Portland cement, high alumina cement, gypsum cement, calcium sulphate hemihydrate in either the alpha or beta form, magnesium oxychloride, magnesium oxysulphate, a calcium sulphoaluminate cement, a alkali silicate, ground granulated blast furnace slag, and a mixture of two or more thereof.

6. A method according to claim 1 wherein in step (1) pellets or chips of a suitable material are milled prior to or after step (2) to reduce the pellets or chips to a feedstock comprising substantially dry finely divided lionocellulosic fibres.

7. A method according to claim 1 wherein in step (2) the feedstock is mixed with:
   (c) a suitable amount of a thermoplastic resin in finely divided particulate or fibrous form.

8. A method according to claim 1 wherein in step (2) the feedstock is mixed with:
   (d) a suitable amount of filler material selected from inorganic or mineral fibres inorganic panicles, synthetic fibres, and mixtures of two or more thereof.

9. A method according to claim 1 wherein in step (3) the starting material of step (2) is subjected to a temperature of from 125° C. to 255° C. inclusive and a pressure of from 0,49 to 6,9 MPa inclusive.

10. A process of preparing a finished product from a cohesive product produced by the method of claim 1, which process includes the step of:
    (A) providing to the cohesive product, water in an amount sufficient for the hydration of the hydraulic binder so that the hydraulic binder sets to form the finished product.

11. A process according to claim 10 wherein in step (A) water is applied to the cohesive product to allow the penetration of a suitable quantity thereof to provide for complete hydration of the hydraulic binder to form the finished product.

12. A process according to claim 10 wherein in step (A) the water necessary for hydration is provided by a component or components of the cohesive product so that on heating the water is released and is utilised by the hydraulic binder to hydrate and set.

\* \* \* \* \*